United States Patent [19]

Boisselier

[11] Patent Number: 5,172,392
[45] Date of Patent: Dec. 15, 1992

[54] APPARATUS FOR THE ANALYSIS IN CONTINUOUS MODE AND IN IMPULSE MODE OF THE DISTRIBUTION OF ENERGY WITHIN A POWER LASER BEAM AND THE ALIGNMENT OF THIS LATTER

[75] Inventor: Didier Boisselier, Prauthoy, France

[73] Assignee: Electricite de Strasbourg, S.A., Strasbourg, France

[21] Appl. No.: 721,382

[22] Filed: Jun. 26, 1991

[30] Foreign Application Priority Data

Jun. 26, 1990 [FR] France .................. 90 08423

[51] Int. Cl.⁵ .............................. H01S 3/08
[52] U.S. Cl. ..................... 372/107; 372/99; 372/35; 372/108
[58] Field of Search ............... 372/29, 26, 32, 38, 372/107, 96, 35, 108

[56] References Cited

U.S. PATENT DOCUMENTS 4,596,461 6/1982 De Rosa et al. ............. 372/99

Primary Examiner—Léon Scott, Jr.
Attorney, Agent, or Firm—Young & Thompson

[57] ABSTRACT

A device for analyzing the distribution of energy within a power laser beam includes a thermoelectric receiver (1) directly exposed to the laser beam (2) and delivering electrical signals to an intermediate demultiplexer and amplifier device. The device operates in continuous mode and in impulse mode, the thermoelectric receiver being constituted by a sealed body (5) whose surface turned toward the source of the laser beam is metallic and constitutes, in cooperation with metallic wires (7), the support of the thermocouples. The wires (7) pass in sealed manner through the surface (8) of the body (5) opposite the surface turned toward the source of the laser beam (2), and the body (5) is provided moreover with two openings (9) for circulation of a cooling fluid. The receiver (1) is integrated into the rear surface of a mirror (18) of the laser cavity, this mirror (18) forming the forward surface of the receiver (1), such that is is possible to analyze continuously the distribution of intensity within a laser beam during a fired pulse or continuously, by the use of a pattern of thermocouples connected to a computer, the receiver (1) being directly and continuously exposed to the beam and permitting visualization in real time of the distribution in the beam.

6 Claims, 1 Drawing Sheet

APPARATUS FOR THE ANALYSIS IN CONTINUOUS MODE AND IN IMPULSE MODE OF THE DISTRIBUTION OF ENERGY WITHIN A POWER LASER BEAM AND THE ALIGNMENT OF THIS LATTER

FIELD OF THE INVENTION

The present invention relates to the field of power lasers, particularly used in industry for welding, cutting and thermal treatment, and has for its object a device for the analysis in continuous mode and in impulse mode of the distribution of energy within a power laser beam and the alignment of this latter.

BACKGROUND OF THE INVENTION

A laser beam is constituted by a high energy luminous wave which originates in a cavity comprising several mirrors between which it performs a number of back and forth movements before being extracted to be directed toward a work station. The energy distribution of a laser beam cut in a plane perpendicular to its axis depends on the geometry of the cavity in which it was generated.

To simplify things, the gaussian beam, which is at present the most widespread, will serve solely as an example, the invention being nevertheless applicable to other shapes of beam without limitation of its performance.

In a gaussian beam, a large part of the energy is concentrated at the center of the spot, and this energy decreases in correspondence with the distance from the axis of the beam along a Gauss curve. In practice, however, the beam is never perfectly gaussian and always has several peaks due to problems of optical aberration, dirt, "wear" and mirror adjustment, etc. . . . These peaks can often be minimalized by precise adjustment of the alignment of the mirrors.

The quality of the beam depends generally on the energy distribution, which conditions the performances during machining operations, such as cutting, welding, thermal treatments, or others, and which must be perfectly controlled. This control of the distribution of the energy within the beam is at present very difficult to effect by simple and inexpensive means, contrary to the adjustment of the various mirrors of the cavity.

At present, such control is effected either by firing into polymethylmethacrylate, or by means of beam analyzers.

Firing into polymethylmethacrylate gives a print of the beam which is, however, unreliable because of alteration of the print by polymethylmethacrylate vapors, thereby permitting only roughly qualitative indications.

Known beam analyzers, which rely on silicon detector technology, permit visualizing on the screen of an oscilloscope the energy distribution within a laser beam, by withdrawing a portion of the incident energy.

But these devices provide results which are hardly reproducible because of the difficulties of adjustment, of the moving members, of the intermediate structure between the beam and the detectors and the small portion of the beam useful for measurement. Moreover, certain of these devices show the profile of energy distribution in the beam only on two axes, without giving the overall shape of this distribution.

There also exist other analysis devices, used in laboratory settings, which permit obtaining good results but which however are not usable industrially because of their excessive complexity.

There is also known, from FR-A-2 619 475, an analysis apparatus of the energy distribution within a power laser beam, constituted essentially by a thermoelectric receiver directly exposed to the laser beam and delivering electrical signals to an intermediate demultiplexer and amplifier, and by a computer or a microcomputer for treating measurements and visualizing in real time the energy distribution in the beam, connected to the intermediate device and piloting this latter, characterized in that it functions in a continuous mode and in an impulse mode, and in that the thermoelectric receiver is constituted by a sealed body, whose surface turned toward the source of the laser beam is metallic and constitutes, in cooperation with metallic wires, the support of the thermocouples disposed on coaxial circles or according to a square or rectangular locus, or also according to a cross or a star, the wires passing in sealed relation through the surface of the body opposite the surface turned toward the source of the laser beam, and the body being provided moreover with two circulation openings for a cooling fluid.

The thermocouples are preferably iron-constantan couples, the surface of the receiver body being comprised by a sheet of pure iron, whose surface condition is uniform, and metal wires being of constantan; the soldering between each wire of the thermocouple and the sheet forming the surface is effected either by a capacitative discharge arc of a row of condensers, or by means of a pulsed laser, by soldering.

The arrangement of the thermocouples is a function of the precision of analysis or required resolution, of the diameter of the beam in the analysis plane, and of the number of channels of the intermediate demultiplexer device to which said thermocouples are connected, and the spacing between each of the thermocouples depends on the diameter of the wires and of the soldering technique that is used.

The surface of the sealed body turned toward the source of the laser beam is cooled by forced circulation of a cooling liquid, generally water, whose flow rate is adjusted so as to permit the establishment of the thermal regime.

The analysis device according to FR-A-2 619 475 is pivotally mounted on an axle parallel to the axis of the laser beam, either externally in front of the output port of the laser cavity, or internally in front of said port within the laser cavity. Thus, to effect a measurement, it suffices to intercept the laser beam by interpositioning the device, this latter being pivoted out of the beam after measurement.

The receiver can also be mounted perpendicularly to the axis of the laser beam and can coact, for measurement, with a removable mask constituted by a mirror inclined at 45° relative to the axes of the laser beam and the receiver, and adapted to be disposed in the path of the laser beam by means of a jack or cam at the time of measurement. Thus, the device permits controlling the beam which is reflected by the mirror onto the receiver before utilization at the work station. In such a case, the control of the beam is effected during dead time, using the receiver as a light trap.

The receiver can also be mounted obliquely relative to the laser beam and coact with a removable mask inclined correspondingly, or can replace this latter, and can reflect the energy not absorbed by the light trap.

In the case of a control of the beam outside the laser cavity, the said device can permit effectuating diagnosis of the condition of the optics by effecting controls of the laser beam before and after each of the optical elements. The device is also utilizable for verifying the directional stability of the mode and size of the beam.

The computer or microcomputer for treating the measured values and for visualizing in real time the distribution of the energy in the beam is connected to the intermediate device by an analog-digital converter, and controls said device by means of a parallel interface. This computer or microcomputer, which comprises in known manner a central unit, a mass memory and a display screen, is connected also to a printer.

This device permits indeed control of the position of the mirrors of the laser cavity by rapid interpretation of the recorded measurements, and thus permits effecting adjustment substantially in real time of said mirrors of the laser cavity, but requires nevertheless a repetition of the measurements after each mirror by displacement and insertion of the receiver in the beam behind each mirror, such that the analysis of the energy distribution remains relatively long in spite of everything.

Moreover, this receiver does not permit simultaneous verification of the alignment of the beam.

SUMMARY OF THE INVENTION

The present invention has for its object to overcome these drawbacks.

It thus has for its object an analysis device in continuous mode and in impulse mode of the energy distribution in a power laser beam and of the alignment of this latter, essentially constituted by a thermoelectric receiver directly exposed to the laser beam and delivering electrical signals to an intermediate demultiplexer and amplifier device, and by a computer or microcomputer for treating the measurements and the visualization in real time of the distribution of the energy in the beam, connected to the intermediate device and controlling this latter, and which operates in continuous and in impulse mode, the thermoelectric receiver being constituted by a sealed body whose surface turned toward the laser beam source is metallic and constitutes in cooperation with metallic wires, the support of the thermocouples disposed on coaxial circles or according to a square or rectangular locus, or even according to a cross or a star, the wires passing in sealed relation through the surface of the body opposite the surface turned toward the laser beam source, and the body being provided moreover with two openings for circulation of cooling fluid, characterized in that the receiver is preferably integrated into the rear surface of a mirror of the laser cavity, said mirror forming the forward surface of said receiver.

BRIEF DESCRIPTION OF THE DRAWINGS

The invention will be better understood from the following description which relates to a preferred embodiment, given by way of non-limiting example, and explained with reference to schematic drawing, in which.

DETAILED DESCRIPTION OF THE INVENTION

Figure 1:
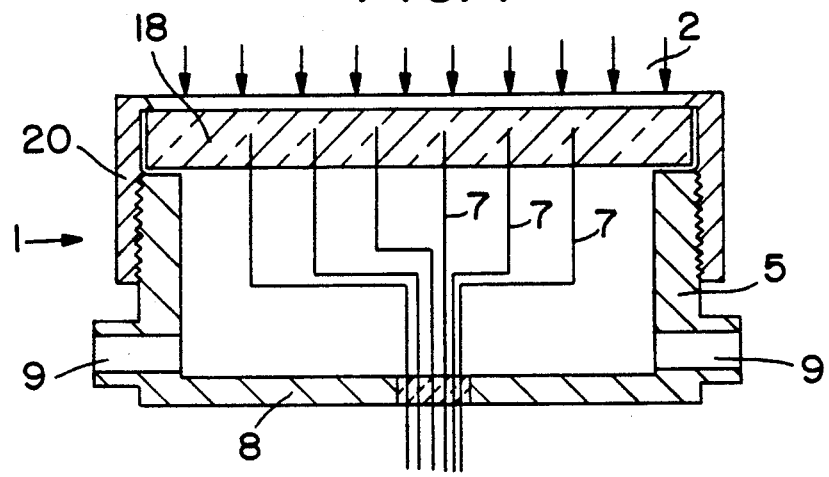
FIG. 1 is a cross-sectional view of a mirror provided with a receiver according to the invention.

According to the invention, and as shown more particularly by way of example in FIG. 1 of the accompanying drawing, the analysis device for the distribution of energy within a power laser beam, which is essentially constituted by a thermoelectric receiver 1 directly exposed to the laser beam 2 and delivering electric signals to an intermediate demultiplexer and amplifier device, and by a computer or microcomputer for treating the measurements and for visualizing in real time the distribution of the energy in the beam 2, connected to the intermediate device and controlling this latter, and which acts in continuous mode and impulse mode, the thermoelectric receiver being constituted by a sealed body 5 whose surface turned toward the source of the laser beam is metallic and constitutes in cooperation with metallic wires 7, the support of the thermocouples disposed on coaxial circles or according to a square or rectangular locus, or even on a cross or a star, the wires 7 passing in sealed relation through the surface 8 of body 5 opposite the surface turned toward the source of laser beam 2, and the body 5 being provided also with two openings 9 for the circulation of a cooling fluid, is characterized in that the receiver 1 is preferably integrated into the rear surface of a mirror 18 of the laser cavity, said mirror 18 forming the forward surface of said receiver.

The mirror 18 which is in known manner a polished copper mirror is preferably pierced on its rear surface, by electro-erosion or by any other piercing technique, with blind holes 19 (FIGS. 1 to 3) terminating short of the reflective surface by a distance corresponding substantially to their diameter, namely of the order of 0.5 mm.

Figure 2:
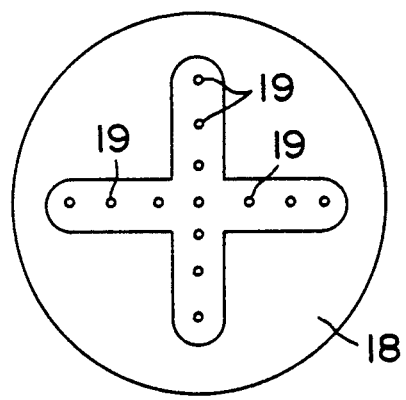
FIG. 2 is a plan view from the front of the mirror according to FIG. 1, the closing cover being removed.
Figure 3:
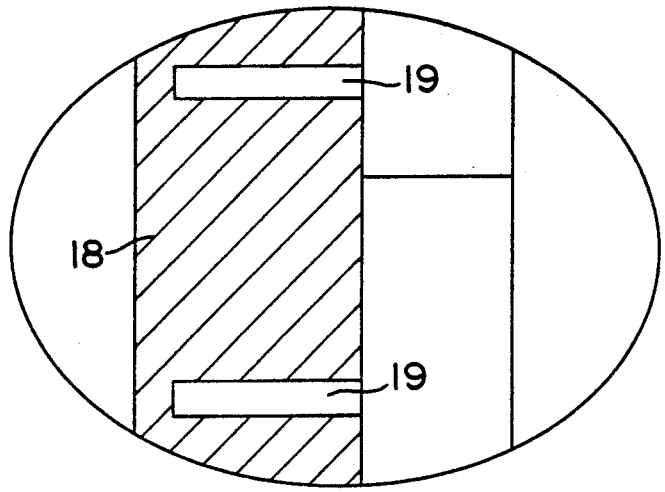
FIG. 3 is a view partially in side elevation and in cross section a larger scale, of the mirror according to FIG. 1.

The blind holes 19 can be distributed over the surface of the rear face of the mirror 18 according to a pre-established pattern, for example in the embodiment shown in FIG. 2, according to the locus of a cross, each hole 18 being provided with a constantan wire 7 soldered in its base by capacitative discharge so as to constitute a thermoelectric couple.

The surface 8 of the receiver opposite the mirror 18 is in the form of a sealed cover provided with sealed passageways for the wires 7 and secured on the rear surface of mirror 18 by means of an internally screw threaded ring 20 bearing on the periphery of mirror 18 and coacting with a screw threading on the receiver 1. Of course, any other arrangement for securing the mirror on the receiver, as well as any other cooling means, are possible.

Thus, a circulation of a cooling fluid, particularly water, is made possible in the rear surface of the mirror 18 forming the receiver.

According to another characteristic of the invention, the mirror 18 forming the receiver is preferably mounted on an axle, actuated by a stepwise or analog motor, whose control is effected by means of the computer or microcomputer for processing the measurements, as a function of these latter.

According to another characteristic of the invention, all the mirrors of the laser cavity are provided with a thermoelectric receiver integrated in their rear surface, such that it is possible to effect the alignment of the laser cavity so as to optimize the output of the laser machine.

The wires 7 are preferably connected to an intermediate demultiplexer device and to a computer or microcomputer for processing the measurements and for displaying in real time the distribution of the energy in the beam 2.

Thanks to the invention, it is possible to analyze continuously the distribution of the intensity within a laser beam during a fired pulse or continuously, by the utilization of a pattern of thermocouples connected to a computer, the receiver 1 comprising said pattern being directly incorporated in at least one mirror 18 and exposed directly and continuously to the beam and permitting the visualization in real time of the distribution in the beam.

Moreover, the device according to the invention permits effecting, through the control of the beam, an optimum adjustment of the mirrors of the laser cavity, by manual intervention or by means of a control. This device is simple to operate and adjust and is low cost, and permits continuous reliable control, namely without any intermediary between the beam and the receiver, and easily usable for information processing. Moreover, this device takes up little space and has no moving parts.

According to another characteristic of the invention, the mirrors disposed directly in the optical transport train of the laser beam are also provided with receivers and permit the control and the alignment, at any place and any time, of the laser beam, particularly in an industrial setting.

The device according to the invention has possibilities for use particularly interesting in an industrial setting. for example, to detect abnormal operation and/or to monitor the condition of a machine, particularly by prerecorded control. In the case of laboratory use, the device permits ensuring usefully the high reproducibility of the tests run. Finally, this device is usable for laser beams of all types and all geometries.

Of course, the invention is not limited to the embodiment described and shown in the accompanying drawing. Modifications remain possible, particularly as to the construction of the various elements or by substitution of technical equivalents, without thereby departing from the scope of protection of the invention.

What is claimed is:

1. In an apparatus for analyzing distribution of energy within a laser beam generated by a high energy luminous wave originating in a laser cavity having at least two mirrors, and said apparatus comprising a thermoelectric receiver (1) directly exposed to the laser beam (2) and delivering electrical signals to an intermediate device including a demultiplexer and amplifier, and a computer for treatment of measurements and for visualization in real time of the distribution of energy within the beam (2), said computer being operatively connected to and controlling said intermediate device, said apparatus operating in continuous mode and in impulse mode, said thermoelectric receiver comprising a sealed body (5), said body having a metallic forward surface facing the laser beam, and providing in cooperation with metallic wires (7) a support for thermocouples, said wires (7) passing in sealed manner through a second surface (8) of the body (5) opposite said forward surface facing the laser beam (2), and said body (5) further including two openings (9) for circulation of a cooling fluid, the improvement wherein the receiver (1) is integrated into a rear surface of a mirror (18) of the laser cavity whereby said mirror (18) forms the forward surface of said receiver (1).

2. Apparatus according to claim 1, wherein the mirror (18) is pierced in its rear surface to form blind holes (19) approaching the reflective surface but terminating short of said reflective surface by a distance corresponding substantially to their diameter.

3. Apparatus according to claim 2, wherein the second surface (8) of the receiver (1) opposite the mirror (18) is in the form of a sealed cover provided with holes for passing said wires (7) and is secured on the rear surface of the mirror (18) by means of an internally screw-threaded ring (20) bearing on the periphery of the mirror (18) and coacting with a screw threaded on the receiver (1).

4. Apparatus according to claim 1, wherein the mirror (18) comprising the receiver is mounted on an axle actuated by a stepping or analog motor, whose control is effected by means of said computer or microcomputer for processing as a function of the measurements.

5. Apparatus according to claim 1, wherein the laser cavity includes several mirrors and a thermoelectric receiver is integrated in the forward surface of each mirror of the laser cavity.

6. Apparatus according to claim 1, further comprising mirrors disposed directly in an optical path of the laser beam, each of these mirrors being provided with receivers for controlling the laser beam alignment.

* * * * *